United States Patent
Jin et al.

(10) Patent No.: US 10,789,298 B2
(45) Date of Patent: Sep. 29, 2020

(54) SPECIALIST KEYWORDS RECOMMENDATIONS IN SEMANTIC SPACE

(71) Applicant: International Business Machines Corporation, Armonk, NY (US)

(72) Inventors: Feng Jin, Beijing (CN); Wen Liu, Beijing (CN); Yong Qin, Beijing (CN); Qin Shi, Beijing (CN); Peng Wang, Beijing (CN); Shi Lei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 774 days.

(21) Appl. No.: 15/352,842

(22) Filed: Nov. 16, 2016

(65) Prior Publication Data

US 2018/0137137 A1    May 17, 2018

(51) Int. Cl.
G06F 16/00    (2019.01)
G06F 16/9032    (2019.01)
G06F 16/36    (2019.01)
G06F 16/33    (2019.01)

(52) U.S. Cl.
CPC .... G06F 16/90324 (2019.01); G06F 16/3334 (2019.01); G06F 16/36 (2019.01)

(58) Field of Classification Search
CPC . G06F 16/90324; G06F 16/3334; G06F 16/36
USPC ....................................................... 707/730
See application file for complete search history.

(56) References Cited

U.S. PATENT DOCUMENTS

| | | | |
|---|---|---|---|
| 6,523,026 B1 * | 2/2003 | Gillis | G06F 16/3332 |
| 6,629,097 B1 * | 9/2003 | Keith | G06F 16/9558 |
| 7,558,778 B2 | 7/2009 | Carus et al. | |
| 9,076,160 B2 | 7/2015 | Gu | |
| 2004/0162824 A1 * | 8/2004 | Burns | G06F 16/353 |
| 2005/0021324 A1 * | 1/2005 | Brants | G06F 40/30 |
| | | | 704/9 |

(Continued)

OTHER PUBLICATIONS

Paredes, "Pervasive Well-being Technology," Electrical Engineering and Computer Sciences University of California at Berkeley, Technical Report No. UCB/EECS-2016-36, May 1, 2016, 176 pages.

*Primary Examiner* — Thanh-Ha Dang
(74) *Attorney, Agent, or Firm* — Amin, Turocy & Watson, LLP

(57) ABSTRACT

Techniques are provided for generating recommended query terms that are specialized to a topic of desired information based on a query associated with a user. In one example, a computer-implemented method comprising selecting, by a system operatively coupled to a processor, a coarse cluster of corpus terms having a defined relatedness to a query associated with a user from a plurality of coarse clusters of corpus terms; and determining, by the system, a plurality of candidate terms from search results associated with the query. The computer-implemented method can also comprise determining, by the system, at least one recommended query term based on refined clusters of the coarse cluster, the candidate terms, and the query; and displaying, by the system, the at least one recommended query term on a display device associated with the query.

20 Claims, 16 Drawing Sheets

(56) References Cited

U.S. PATENT DOCUMENTS

| | | | |
|---|---|---|---|
| 2005/0187931 A1* | 8/2005 | Cofino | G06F 16/3344 |
| 2010/0100543 A1* | 4/2010 | Brady | G06F 16/31 |
| | | | 707/732 |
| 2010/0131563 A1 | 5/2010 | Yin | |
| 2011/0093452 A1* | 4/2011 | Jain | G06F 16/3322 |
| | | | 707/723 |
| 2011/0213777 A1* | 9/2011 | Sun | G06F 16/353 |
| | | | 707/740 |
| 2011/0225155 A1* | 9/2011 | Roulland | G06F 16/285 |
| | | | 707/737 |
| 2013/0007057 A1 | 1/2013 | Li et al. | |
| 2015/0261850 A1* | 9/2015 | Mittal | G06F 16/285 |
| | | | 707/724 |
| 2015/0339381 A1* | 11/2015 | Jain | G06F 16/9024 |
| | | | 707/798 |
| 2016/0005097 A1* | 1/2016 | Hsiao | G06Q 30/0631 |
| | | | 705/26.7 |
| 2016/0078507 A1* | 3/2016 | Shivaswamy | G06F 16/215 |
| | | | 705/26.2 |
| 2016/0179945 A1* | 6/2016 | Lastra Diaz | G06F 16/3334 |
| | | | 707/739 |
| 2016/0188702 A1 | 6/2016 | Lee-Goldman et al. | |
| 2017/0308613 A1* | 10/2017 | Zhu | G06F 16/9535 |

\* cited by examiner

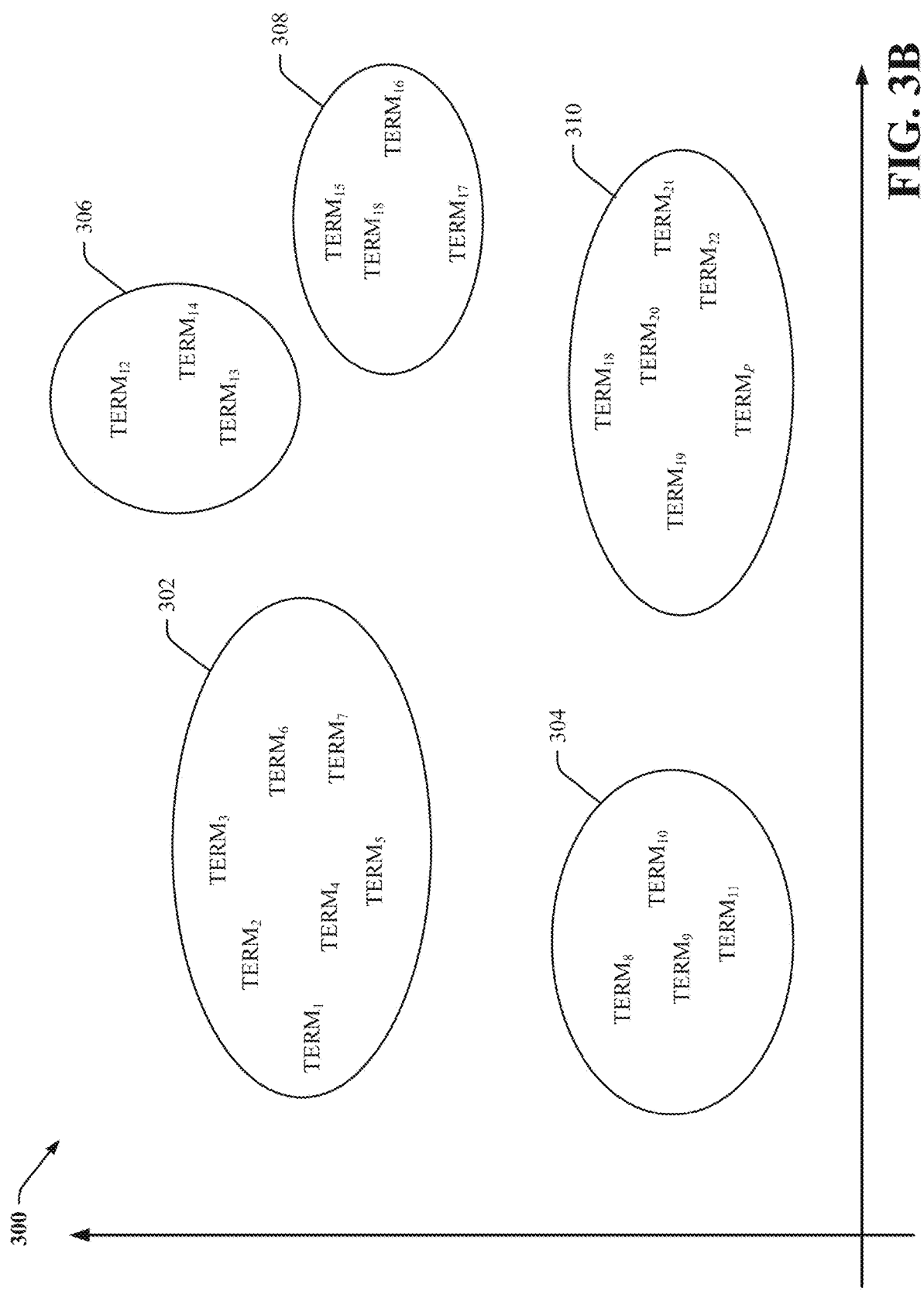

SEARCH | draw graph bar where each bar contains multiple colors

506 javascript - How to assign random colors to D3 bar chart? - [Stack]...
stackoverflow.com/questions/.../how-to-assign-random-colors-to-d3-bar-cha... ▼ 翻译此页
2014年2月17日 - 4. I am working on a D3 bar chart as below: Bar Chart. How do I make the bars to have random colors?... Another tutorial by Jerome Cukier.

label - Text On each bar of a [stacked bar] chart d3.js - Stack Overflow
stackoverflow.com/questions/.../text-on-each-bar-of-a-stacked-bar-chart-d3-... ▼ 翻译此页
2013年7月10日 - Text On each bar of a [stacked bar] chart d3.js. No problem. We won't ... This binds each data point to the colored rectangles. To add text, change ...

d3: scales, and color. | Jerome Cukier
www.jeromecukier.net/blog/2011/08/11/d3-scales-and-color/ ▼ 翻译此页
2014年8月11日 - You would like to plot it, say, in a bar chart, which can be only 120 pixels tall. ... For all scales, with the exception of quantize and quantile scales which are ... where domain could be a whole dataset. in d3, domain contains the ...

Examples - Square Open Source
https://square.github.io/intro-to-d3/examples/ ▼ 翻译此页
Let's start out by walking through using D3 to draw a simple pie chart. ... color based on an ID var color = d3.scale.category10(); var svg = d3.select('svg.pie') var ... after the first layer, each new layer of bars depends on layout of the previous one. ... While normally a bar graph would have one y value, [stacked] array is one has two.

Creating Multi-Series Charts in D3 — delimited
www.delimited.io/.../creating-multi-series-charts-in-d3-lines-bars—area-and-st... ▼ 翻译此页
2014年5月4日 - This post looks at multi-series line [stacked] [bar] area, and ... In doing this we also need to identify the categorical variable that contains the label or category for each ... That array is then used to set the color domain and will be used on ... I was trying to use DIVs to separate the chart from the graph.

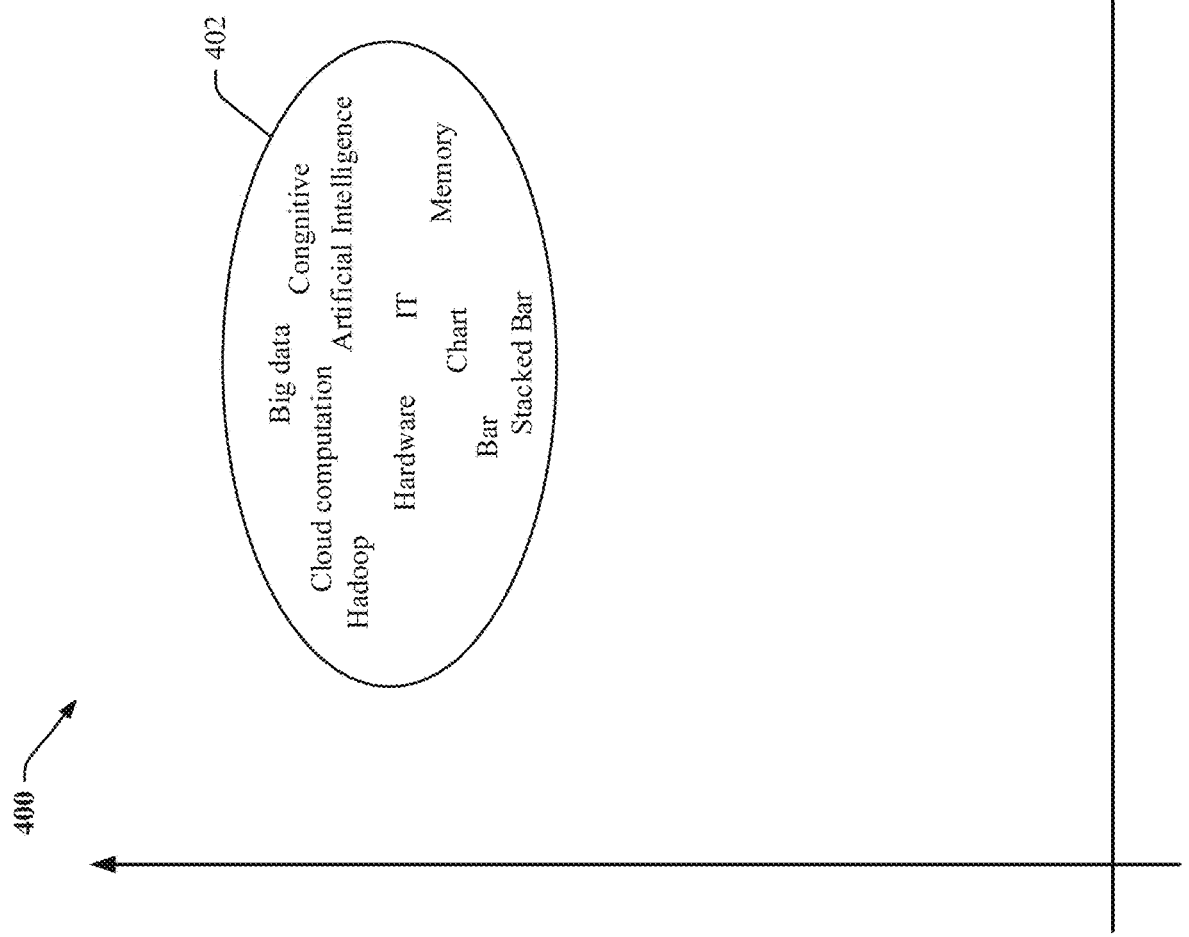

Javascript
Random colors
Stacked bar
Stack overflow
...

FIG. 9

SPECIALIST KEYWORDS RECOMMENDATIONS IN SEMANTIC SPACE

BACKGROUND

The subject disclosure relates generally to recommending query terms and in particular to generating recommended query terms in view of clusters of terms from a text corpus.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. One or more embodiments described herein include a system, computer-implemented method, and/or computer program product, in accordance with the present invention.

According to an embodiment, a system is provided. The system comprises a memory that stores computer executable components; and a processor that executes the computer executable components stored in the memory. The computer executable components can comprise: a cluster selection component that, in response to receiving a query, selects a coarse cluster of corpus terms having a defined relatedness to the query associated with a plurality of coarse clusters of corpus terms; a candidate component that determines a plurality of candidate terms from search results associated with the query; and a recommendation component that determines at least one recommended query term based on refined clusters of the coarse cluster, the plurality of candidate terms, and the query.

Other embodiments include a computer-implemented method and a computer program product.

BRIEF DESCRIPTION OF THE DRAWINGS

FIG. 3B illustrates another exemplary (non-limiting) semantic space in accordance with one or more embodiments described herein.

FIG. 5 illustrates an example, non-limiting search user interface in accordance with one or more embodiments described herein.

FIG. 6 illustrates another example of the semantic space depicted in FIG. 4B in accordance with one or more embodiments described herein.

FIG. 8 illustrates another example of a search user interface in accordance with one or more embodiments described herein.

FIG. 9 illustrates another example of the search user interface depicted in FIG. 5, in accordance with one or more embodiments described herein.

DETAILED DESCRIPTION

Figure 1:
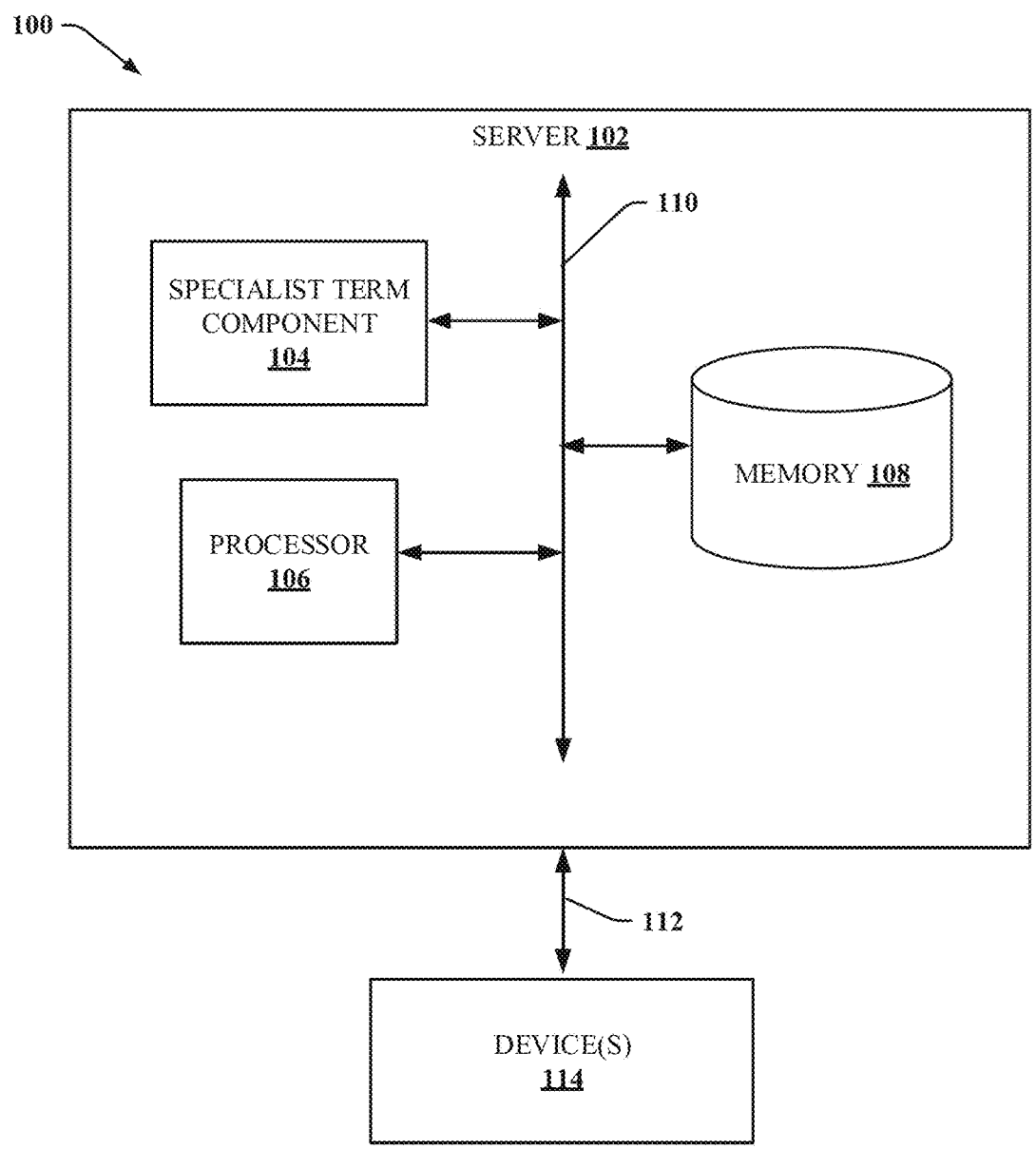
FIG. 1 illustrates a block diagram of an example, non-limiting system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

A vast array of information covering a variety of topics (e.g., domain, subject, section, theme, motif, matter) can be accessible to users through search engines and/or intelligent applications. A user can enter a query into a search engine and received many search results related to the query. The user can then sift through the search results to located desired information. However, the search results and their rankings are highly dependent on the query submitted. A user can often describe their desired information using sentence or paragraph which they enter into a query without knowing a specialist term that describes the desired information. A user who is not familiar with a topic (e.g., a novice user, an inexperienced user, a user new to the topic) often submits a query that returns many search results that are not targeted to the desired information, thus requiring the user to sift through many undesired results to understand the topic and locate the desired information. Other times a user may know a specialist term that they would like to query but cannot recall the specialist term at the time of entering a query.

In a non-limiting example, a first user who is not familiar with the topic of graphing (e.g., charting) can enter a query "draw graph bar where each bar contains multiple colors". A second user who is more familiar with the topic of graphing can know the specialist term "stacked bar" to describe the type of graph that the first user intended to query with "draw graph bar where each bar contains multiple colors". In another non-limiting example, a non-medical professional user who is not familiar with the topic of cancer can enter a query "a cancer that affects the blood and bones". A medical professional user who is familiar with the topic of cancer can know the specialist term "leukemia" to describe the type of cancer that the non-medical professional user intended to query with "a cancer that affects the blood and bones". In a further example, a programmer who is familiar with the topic of computer software but not familiar with the topic of electrical engineering can enter a query "a hardware circuit that I can program in a device I receive". A hardware engineer who is familiar with the topic of electrical engineering can know the specialist term "field programmable gate array" to describe the type of integrated circuit that the programmer intended to query with "a hardware circuit that I can program in a device I receive".

To address the challenges in generating recommended query terms (e.g., specialist terms) that are specialized to a topic of desired information based on a query associated with a user (e.g. user query, query submitted by a user) as described herein, one or more exemplary embodiments of the invention can generate recommended query terms to a user based on a query associated with a user and associated search results in view of clusters of terms from a text corpus. A text corpus comprising documents related to one or more topics can be obtained. Corpus terms from the documents can be converted to corpus term vectors in a multi-dimensional semantic space. The corpus terms can be coarse clustered using the associated corpus term vectors and a clustering algorithm into a plurality of coarse clusters. A query associated with a user can be converted to a query vector having the same dimensions as the corpus term vectors. A coarse cluster can be selected that is most related to the query vector. The corpus terms in the selected coarse cluster can be refined clustered using the associated corpus term vectors and a clustering algorithm into a plurality of refined clusters. Candidate terms can be identified from search results associated with the query. Candidate terms that exist in the refined clusters can be added to a list of recommended query terms. Also, a respective term closest to the center of each refined cluster that contained a candidate term can also be added to the list of recommended query terms. The list of recommended terms can be sorted according to a sorting criteria, and the sorted list can be presented to the user. If no candidate terms exist in the refined clusters, then a refined cluster most related to the query vector can be selected, and a term closest to the center of the selected refined cluster can be selected as a recommended query term and provided to the user.

In a non-limiting example, a term can be a word, plurality of words, phrase, a sentence or any other suitable combination of words. For example, a term can be a word or combination of words that has an exact meaning. It is to be appreciated that a topic can comprise any suitable domain and/or subject of information at any suitable level of granularity.

One or more embodiments of the subject disclosure is directed to computer processing systems, computer-implemented methods, apparatus and/or computer program products that facilitate efficiently, effectively, and automatically (e.g., without direct human involvement) generating recommended query terms that are specialized to a topic of desired information based on a query associated with a user. The computer processing systems, computer-implemented methods, apparatus and/or computer program products can employ hardware and/or software to solve problems that are highly technical in nature (e.g., adapted to perform automated generation of recommended query terms that are specialized to a topic of desired information based on a query associated with a user, adapted to generate and/or employ one or more different detailed, specific and highly-complex models) that are not abstract and that cannot be performed as a set of mental acts by a human. For example, a human, or even thousands of humans, cannot efficiently, accurately and effectively manually gather and analyze thousands of data elements related to a variety of topics in a real-time network based computing environment to generate recommended query terms that are specialized to a topic of desired information based on a query associated with a user. One or more embodiments of the subject computer processing systems, methods, apparatuses and/or computer program products can enable the automated generation of recommended query terms that are specialized to a topic of desired information based on a query associated with a user in a highly accurate and efficient manner By employing automated analysis of a query associated with a user and associated search results in view of clusters of terms from a text corpus to recommended query terms that are specialized to a topic of desired information based on a query associated with a user, the processing time and/or accuracy associated with the existing automated query systems is substantially improved. Additionally, the nature of the problem solved is inherently related to technological advancements in Internet-based media and/or transactions that have not been previously addressed in this manner. Further, one or more embodiments of the subject techniques can facilitate improved performance of automated generation of recommended query terms that are specialized to a topic of desired information based on a query associated with a user that provides for more efficient usage of storage resources, processing resources, and network bandwidth resources to provide highly granular and accurate recommended query terms that are specialized to a topic of desired information based on a query associated with a user. For example, by providing accurate recommendations of query terms to a user, wasted usage of processing, storage, and network bandwidth resources can be avoided by mitigating the need for a user to iterate through excess query refinements to obtain desired information.

By way of overview, aspects of systems apparatuses or processes in accordance with the present invention can be implemented as machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

FIG. 1 illustrates a block diagram of an example, non-limiting system 100 that facilitates generating recommended query terms that are specialized to a topic of desired information based on a query associated with a user in accordance with one or more embodiments described herein. Repetitive description of like elements employed in one or more embodiments described herein is omitted for sake of brevity.

As shown in FIG. 1, the system 100 can include a server 102, one or more networks 112 and one or more devices 114. Server 102 can include a specialist term component 104 that can facilitate generating recommended query terms that are specialized to a topic of desired information based on a query associated with a user. Server 102 can also include or otherwise be associated with at least one included memory 108 that can store computer executable components (e.g., computer executable components can include, but are not limited to, the specialist term component 104 and associated components), and can store any data generated by specialist term component 104 and associated components. Server 102 can also include or otherwise be associated with at least one processor 106 that executes the computer executable components stored in memory 108. Server 102 can further include a system bus 110 that can couple the various server components including, but not limited to, the specialist term component 104, memory 108 and/or processor 106. While a server 102 is shown in FIG. 1, in other embodiments, any number of different types of devices can be associated with or include the components shown in FIG. 1 as part of the specialist term component 104. For example, a device such as device 114 can include all or some of the components of specialist term component 104. All such embodiments are envisaged.

Server 102 can be any computing device that can be communicatively coupled to one or more devices 114, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device 114 can be any device that can communicate with server 102, and/or any other suitable device that can employ information provided by server 102. It is to be appreciated that server 102, and/or device 114 can be equipped with communication components (not shown) that enable communication between server 102 and/or device 114 over one or more networks 112.

The various devices (e.g., server 102, devices 114) and components (e.g., specialist term component 104, memory 108, processor 106 and/or other components) of system 100 can be connected either directly or via one or more networks 112. Such networks 112 can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

Figure 2:
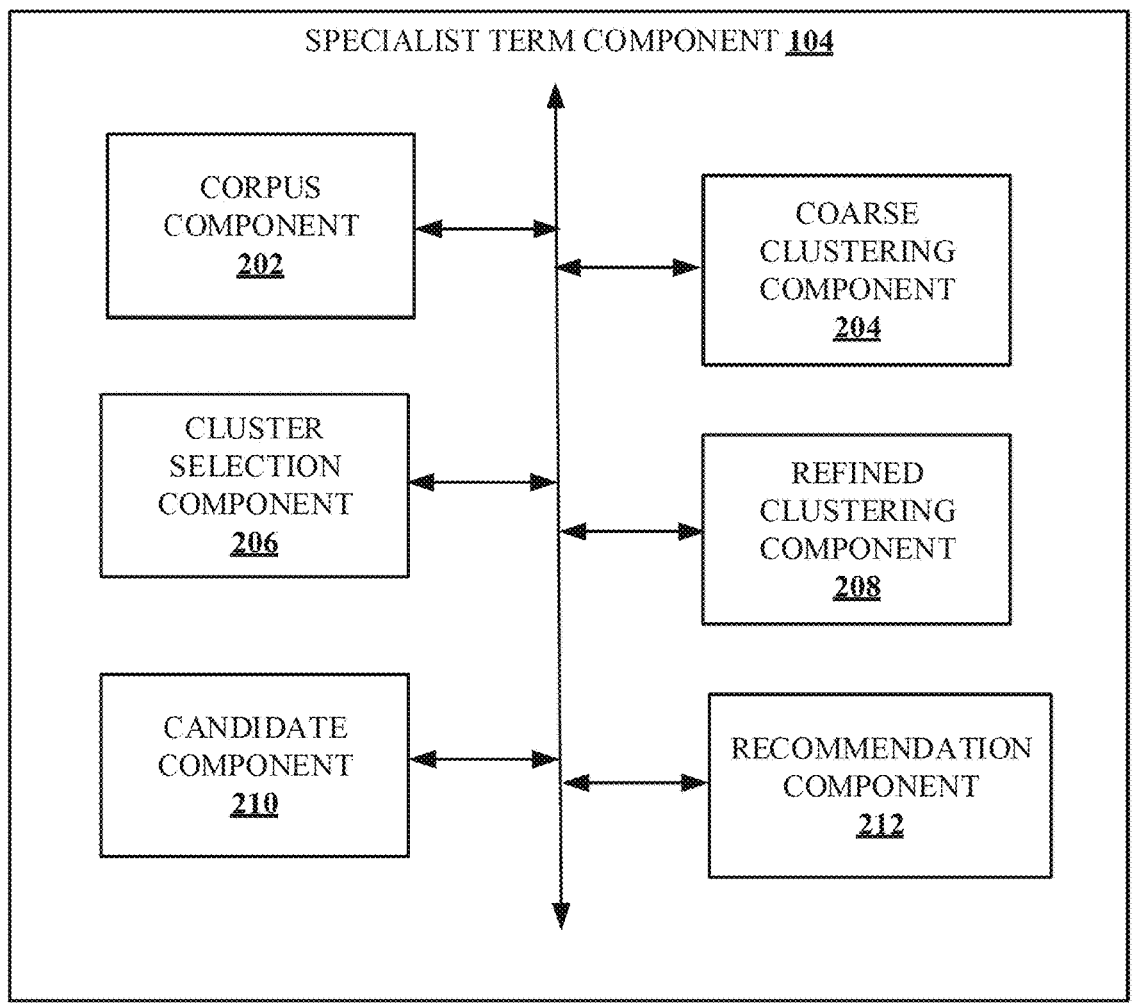
FIG. 2 illustrates a block diagram of an example, non-limiting, specialist term component in accordance with one or more embodiments described herein.

FIG. 2 illustrates a block diagram of an example, non-limiting specialist term component 104 in accordance with one or more embodiments described herein. Repetitive description of like elements employed in one or more embodiments described herein is omitted for sake of brevity.

In one or more embodiments, the specialist term component 104 can automatically generate recommended query terms that are specialized to a topic of desired information based on a query associated with a user (e.g., based on a user's query in some embodiments). Specialist term component 104 can include corpus component 202 that can automatically obtain a text corpus comprising documents on one or more topics. In a non-limiting example, a document can include, but is not limited to, a book, a magazine, an article, a poem, a white paper, technical literature, product literature, a user manual, an encyclopedia, a dictionary, a lexicon, a web page, a website, a blog post, an advertisement, a library, a database, text converted from audio, or any other suitable form of text. In a non-limiting example, corpus component 202 can obtain a text corpus that covers a broad array of topics, such as in non-limiting examples, including, but not limited to, health, arts, government, vehicles, science, and any other suitable topics. For example, this can be useful when specialist term component 104 is employed in association with a search engine (e.g., GOOGLE®, BING®, YAHOO!®) that searches the entire Internet. In another example, corpus component 202 can obtain a text corpus that covers a specific topic, such as in a non-limiting example, pharmaceuticals. This can be useful when specialist term component 104 is employed in association with a targeted search engine, such as in a non-limiting example, associated with a medical website and/or an application (e.g., WEBMD®, RXLIST®). It is to be appreciated that the text corpus can be associated with any suitable topics and comprise any suitable documents.

Corpus component 202 can convert terms (e.g., corpus terms) from documents in the corpus to vectors (e.g., corpus term vectors) in a semantic space using any suitable word embedding model, non-limiting examples of which can include, but are not limited to, Word2vec model, GloVe, Long short-term memory (LSTM) learning, convolutional neural network (CNN, or ConvNet) learning, Gated Recurrent Unit (GRU) learning, Deep Learning, Attention Mechanism Deep Learning, Recurrent Neural Network (RNN), neural networks, Principal Component Analysis (PCA), T-Distributed Stochastic Neighbour Embedding (t-SNE) or any other suitable word embedding model. In various embodiments, word embedding can be a language modeling and feature learning technique in natural language processing (NLP) in which terms from a corpus are mapped to vectors of real numbers in a low-dimensional space relative to the corpus size. In a non-limiting example, corpus component 202 can exclude corpus terms that are stopwords when converting corpus terms to corpus term vectors. In a non-limiting example, stopwords can include the most common words in a language (e.g., "a", "the", "is", "at", etc. . . . ), short function words, articles, prepositions, words which do not contain important significance to be used in search queries, or any other suitable words selected as stopwords.

In a non-limiting example, corpus component 202 can convert term $TERM_1$ from a text corpus to a corpus term vector $(a_1, a_2, \ldots, a_n)$, where n is a positive integer representing the number of dimensions of the vector and $a_1, a_2, \ldots, a_n$ are the numerical values of each dimension of the corpus term vector for $TERM_1$. It is to be appreciated that any suitable number of dimensions can be employed for a vector. Corpus component 202 another term $TERM_2$ from the text corpus to a corpus term vector $(b_1, b_2, \ldots, b_n)$, where $b_1, b_2, \ldots, b_n$ are the numerical values of each dimension of the corpus term vector for $TERM_2$. For example, a term "cognitive" can be converted by corpus component 202 to a vector Vec(Cognitive)=[−0.009, 0.042, 0.075, −0.021, −0.011, 0.047, 0.085, . . . ], and a term "angiocarpy" can be converted by corpus component 202 to a vector Vec(Angiocarpy)=[0.088, −0.067, −0.452, 0.069, 0.035, −0.044, −0.079, . . . ], where Vec(Cognitive) and Vec(Angiocarpy) have the same number of dimensions. It is to be appreciated that corpus component 202 can store information describing the text corpus and determined corpus term vectors of the semantic space in memory 108. Furthermore, as new documents are added to the text corpus, corpus component 202 can automatically generate corpus term vectors from the new documents. Additionally, as documents in the text corpus are revised, corpus component 202 can automatically generate corpus term vectors from the revised documents and remove corpus term vectors associated with older versions of the revised documents. In another example, coarse clustering component 204 can automatically generate corpus term vectors at a predefined interval, based on a predefined number of changes to the text corpus, dynamically, or based on any other suitable vector generation criteria.

Figure 3A:
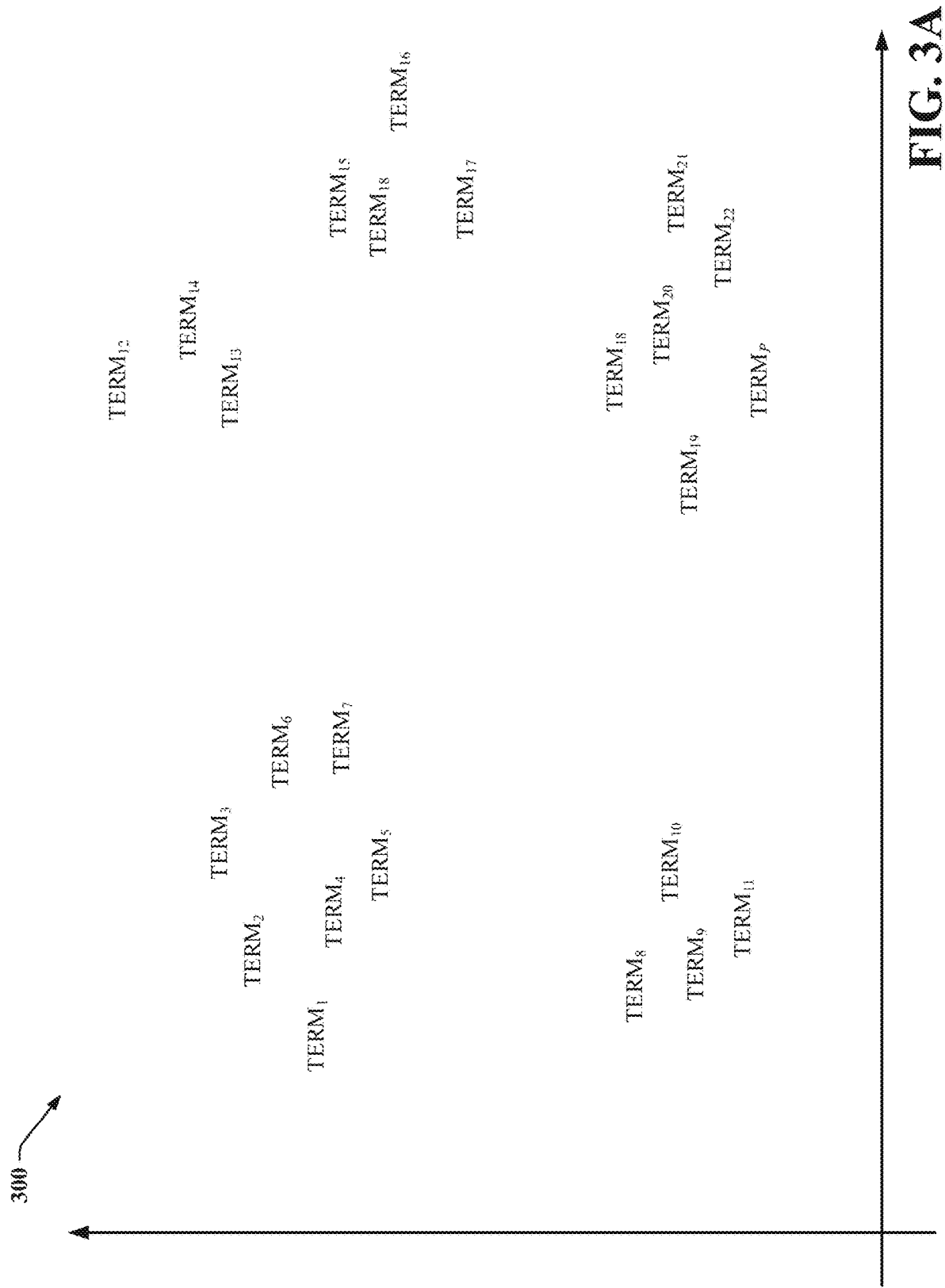
FIG. 3A illustrates an example, non-limiting semantic space in accordance with one or more embodiments described herein.

FIG. 3A illustrates a block diagram of an example, non-limiting semantic space 300 having terms $TERM_1 \ldots TERM_P$ mapped based on their associated corpus term vectors in accordance with one or more embodiments described herein. Repetitive description of like elements employed in one or more embodiments described herein is omitted for sake of brevity.

In this example, terms $TERM_1 \ldots TERM_P$ have been converted to corpus term vectors by corpus component 202, where P is a positive integer representing the number of terms in the text corpus that were converted to corpus term vectors. It is to be appreciated that the semantic space 300 can have dimensions corresponding to the number dimensions in the corpus term vectors.

Figure 4A:
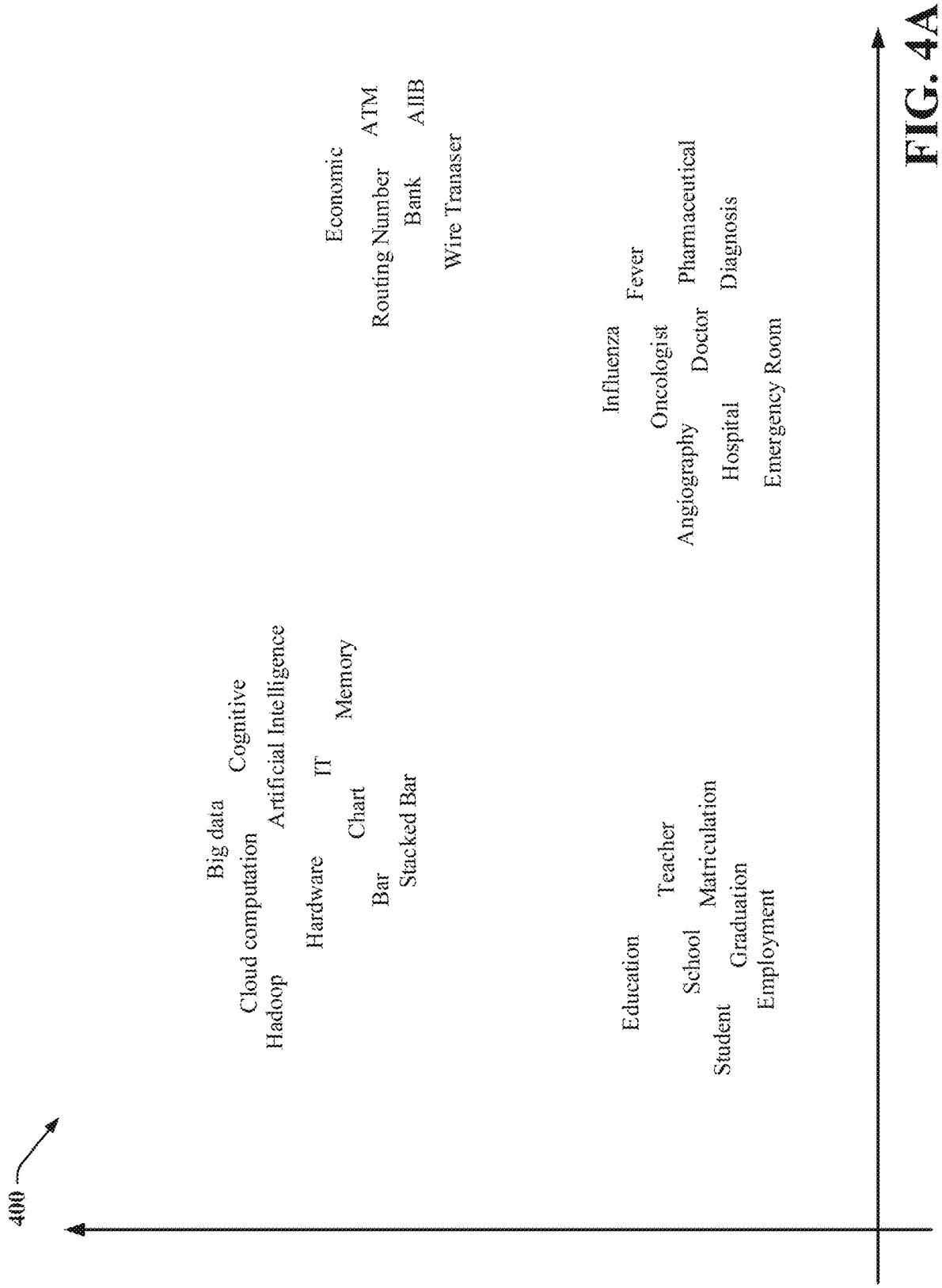
FIG. 4A illustrates another exemplary (non-limiting) semantic space in accordance with one or more embodiments described herein.

FIG. 4A illustrates a block diagram of an example, non-limiting semantic space 400 having terms mapped based on their associated corpus term vectors in accordance with one or more embodiments described herein. Repetitive description of like elements employed in one or more embodiments described herein is omitted for sake of brevity.

In this example, terms "Big Data", "IT", "Cloud computation", "Cognitive", "Artificial Intelligence", "Hardware", "Hadoop", "Chart", "Memory", "Bar", "Stacked Bar", "Economic", "Routing Number", "ATM", "Bank", "AIIB", "Wire Transfer", "Education", "Teacher", "School", "Matriculation", "Student", "Graduation", "Employment", "Influenza", "Fever", Oncologist", "Pharmaceutical", "Doctor", "Hospital", "Diagnosis", and "Emergency Room" have been converted to corpus term vectors by corpus component 202 and mapped to semantic space 400. It is to be appreciated that the semantic space 400 can have dimensions corresponding to the number dimensions in the corpus term vectors.

Referring again to FIG. 2, specialist term component 104 can also include coarse clustering component 204 that can generate coarse clusters from the corpus term vectors generated by corpus component 202 for a text corpus. Coarse clustering component 204 can employ a clustering model to generate coarse clusters that place each corpus term into a coarse cluster of the coarse clusters based on the corpus term vector associated with the corpus term. In a non-limiting example, coarse clustering component 204 can place corpus terms in coarse clusters such that each corpus term is included in only one coarse cluster. In another non-limiting example, coarse clustering component 204 can place corpus terms in coarse clusters such that a corpus term can be included in more than one coarse cluster. Non-limiting examples of clustering models can include density peak searching clustering, k-means clustering, k-medoids clustering, connectivity-based clustering, centroid-based clustering, distribution-based clustering, density-based clustering, fuzzy clustering, biclustering, or any other suitable clustering model.

FIG. 3B illustrates a block diagram of an example, non-limiting semantic space 300 from FIG. 3A having terms $TERM_1 \ldots TERM_P$ clustered by coarse clustering component 204 based on their associated corpus term vectors in accordance with one or more embodiments described herein. Repetitive description of like elements employed in one or more embodiments described herein is omitted for sake of brevity.

In this non-limiting example, terms $TERM_1 \ldots TERM_7$ are included in coarse cluster 302, terms $TERM_8 \ldots TERM_{11}$ are included in coarse cluster 304, terms $TERM_{12} \ldots TERM_{14}$ are included in coarse cluster 306, terms $TERM_{15} \ldots TERM_{17}$ are included in coarse cluster 308, and terms $TERM_{18} \ldots TERM_P$ are included in coarse cluster 310. It is to be appreciated that while five coarse clusters are depicted in the example, coarse clustering component 204 can generate any suitable number of coarse clusters.

Figure 4B:
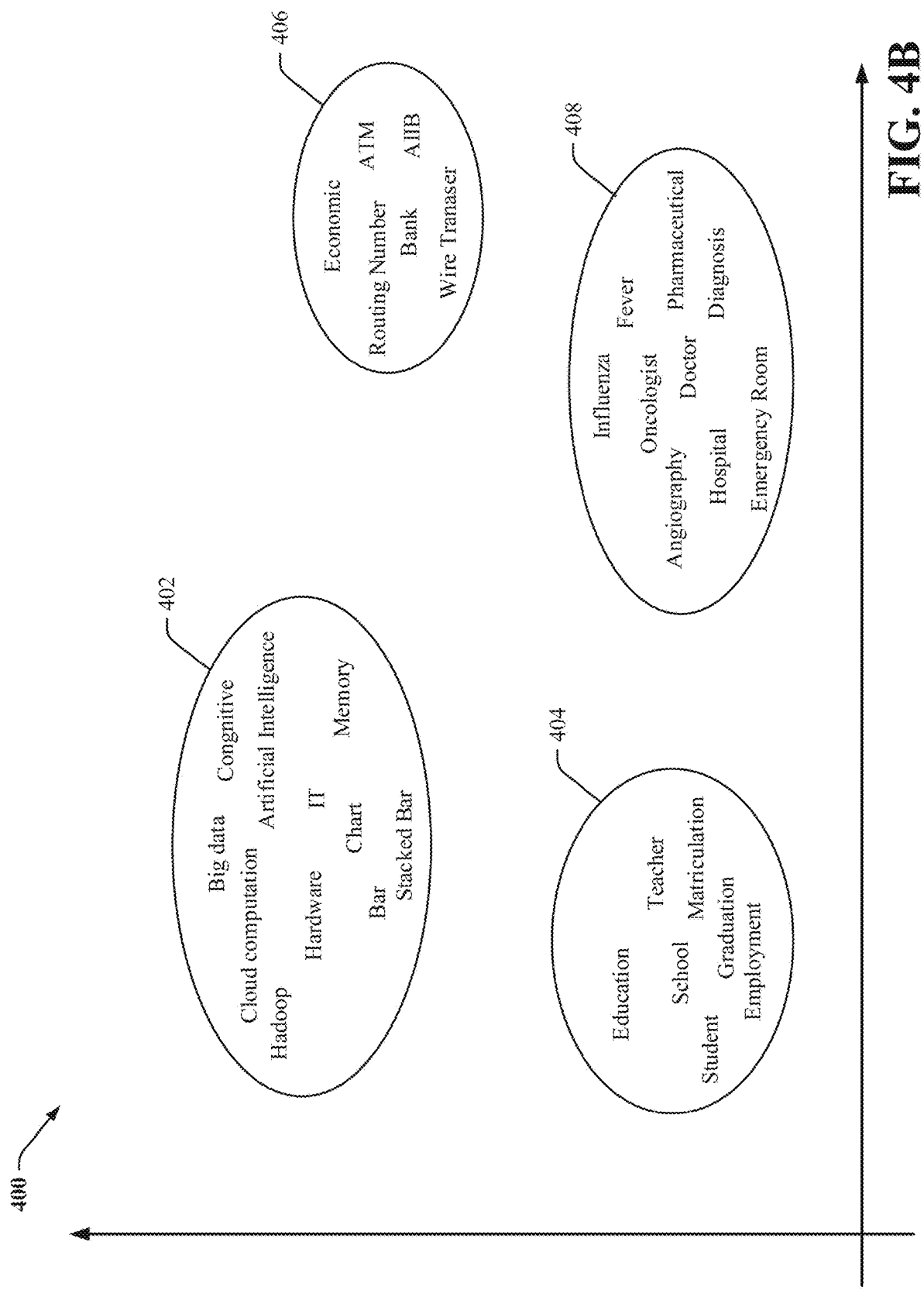
FIG. 4B illustrates yet another exemplary (non-limiting) semantic space from in accordance with one or more embodiments described herein.

FIG. 4B illustrates a block diagram of an example, non-limiting semantic space 400 from FIG. 4A having terms clustered by coarse clustering component 204 based on their associated corpus term vectors in accordance with one or more embodiments described herein. Repetitive description of like elements employed in one or more embodiments described herein is omitted for sake of brevity.

In this non-limiting example, terms "Big Data", "IT", "Cloud computation", "Cognitive", "Artificial Intelligence", "Hardware", "Hadoop", "Chart", "Memory", "Bar", and "Stacked Bar" are included in coarse cluster 402, terms "Economic", "Routing Number", "ATM", "Bank", "AIIB", and "Wire Transfer" are included in coarse cluster 404, terms "Education", "Teacher", "School", "Matriculation", "Student", "Graduation", and "Employment" are included in coarse cluster 406, and terms "Influenza", "Fever", Oncologist", "Pharmaceutical", "Doctor", "Hospital", "Diagnosis", and "Emergency Room" are included in coarse cluster 408. It is to be appreciated that while four clusters are depicted in the example, coarse clustering component 204 can generate any suitable number of coarse clusters.

It is to be appreciated that coarse clustering component 204 can store information describing the coarse clusters of the corpus term vectors in memory 108. In a non-limiting example, as corpus term vectors are added and/or removed from semantic space in association with a text corpus, coarse clustering component 204 can automatically re-cluster the corpus term vectors. In another example, coarse clustering component 204 can automatically re-cluster the corpus term vectors at a predefined interval, based on a predefined number of changes to a semantic space, dynamically, or based on any other suitable re-clustering criteria.

Referring again to FIG. 2, specialist term component 104 can also include cluster selection component 206 that can select a coarse cluster related to a query associated with a user. Cluster selection component 206 can obtain a query associated with a user and search results of the query. In a non-limiting example, this can occur in real-time as the user is executing a query with a search engine or application in order to provide real-time recommendations on query terms. Cluster selection component 206 can employ a word embedding model to convert the query into a vector (e.g., query vector) having the same number of dimensions as the corpus term vectors. In a non-limiting example, cluster selection component 206 can employ a same word embedding model as corpus component 202 employed to generate corpus term vectors. In a non-limiting example, cluster selection component 206 can remove stopwords from the query prior to converting the query to a query vector.

FIG. 5 illustrates a block diagram of an example, non-limiting search user interface 502 in accordance with one or more embodiments described herein. In this example, a query "draw graph bar where each bar contains multiple colors" has been entered in a search field 504 and a set of search results 506 have been returned. Cluster selection component 206 can convert query "draw graph bar where each bar contains multiple colors" into a query vector.

Referring again to FIG. 2, cluster selection component 206 can employ query vector to identify a coarse cluster that is most related to the query. Cluster selection component 206 can determine respective vectors (e.g., center vector) associated with the centers of the coarse cluster. In a non-limiting example, cluster selection component 206 can determine respective distances between the query vector and the center vectors, and select a coarse cluster that has a least distance between the query vector and the center vector associated with the selected coarse cluster. Cluster selection component 206 can employ a distance computation technique for determining distances between vectors, non-limiting examples of which Euclidian distance, Cosine distance, Manhattan distance, Hamming distance, or any other suitable technique for determining distance between two vectors.

Referring now to FIGS. 4B and 5, cluster selection component 206 can determine respective distances between the query vector associated with "draw graph bar where each bar contains multiple colors" and center vectors associated with the centers of coarse clusters 402, 404, 406, and 408, and/or select a coarse cluster having least distance between the query vector and the center vector associated with the selected coarse cluster.

FIG. 6 illustrates a block diagram of an example, non-limiting semantic space 400 from FIG. 4B where coarse cluster 402 is selected in accordance with one or more embodiments described herein. Repetitive description of like elements employed in one or more embodiments described herein is omitted for sake of brevity. In this example, cluster selection component 206 determined that query vector associated with query "draw graph bar where each bar contains multiple colors" is closest to center vector associated with coarse cluster 402 and has selected coarse cluster 402 as a most related cluster to the query.

Referring again to FIG. 2, specialist term component 104 can also include refined clustering component 208 that can perform refined clustering on a coarse cluster selected by cluster selection component 206. Refined clustering component 208 can employ a clustering model to generate refined clusters that place each corpus term from the selected coarse cluster into a refined cluster of the refined clusters based on the corpus term vector associated with the corpus term. In a non-limiting example, refined clustering component 208 can employ a same clustering model as employed by coarse clustering component 204. In another non-limiting example, refined clustering component 208 can employ a different clustering model than employed by coarse clustering component 204.

Figure 7:
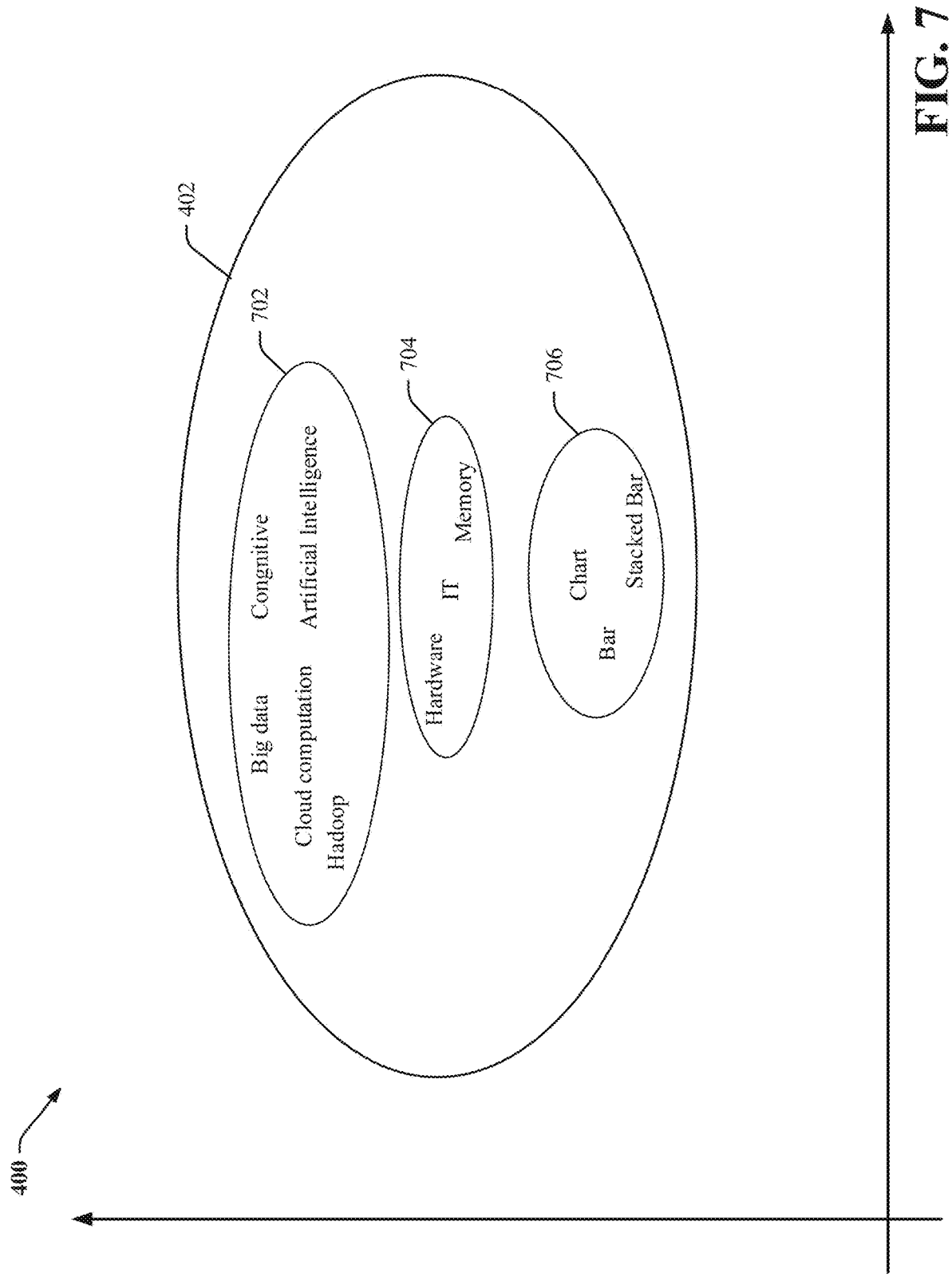
FIG. 7 illustrates another example of the semantic space depicted in FIG. 6 in accordance with one or more embodiments described herein.

FIG. 7 illustrates a block diagram of an example, non-limiting semantic space 400 from FIG. 6 where coarse cluster 402 has been refined into refined clusters by refined clustering component 208 in accordance with one or more embodiments described herein. Repetitive description of like elements employed in one or more embodiments described herein is omitted for sake of brevity. In this non-limiting example, terms "Big Data", "Cloud computation", "Cognitive", "Artificial Intelligence", and "Hadoop" are included in refined cluster 702, terms "IT", "Hardware", and "Memory" are included in refined cluster 704, and terms "Chart", "Bar", and "Stacked Bar are included in refined cluster 706. It is to be appreciated that while three refined clusters are depicted in the example, refined clustering component 208 can generate any suitable number of refined clusters.

Referring again to FIG. 2, specialist term component 104 can also include candidate component 210 that can identify candidate terms from search results associated with a query. Candidate component 210 can select a portion of the search results associated with the query. The portion can include all of the search results or a subset of the search results. The subset of the search results can include a defined number of search results, a defined number of pages of search results, a defined number of highest ranked search results, a defined number of pages of highest ranked search results, or any other suitable subset of the search results. Candidate component 210 can employ a word embedding model to convert terms (e.g., candidate term) of the selected portion of search results into vectors (e.g., candidate term vector) having the same number of dimensions as the corpus term vectors. In a non-limiting example, candidate component 210 employ summary text included for each search result included of the selected portion of search results for conversion to candidate term vectors. In another non-limiting example, candidate component 210 retrieve documents linked by each search result included of the selected portion of search results for conversion to candidate term vectors. In a non-limiting example, candidate component 210 can employ a same word embedding model as corpus component 202 employed to generate corpus term vectors. In an additional non-limiting example, Candidate component 210 can remove stopwords from the search results prior to converting the query to a query vector.

Figure 8:
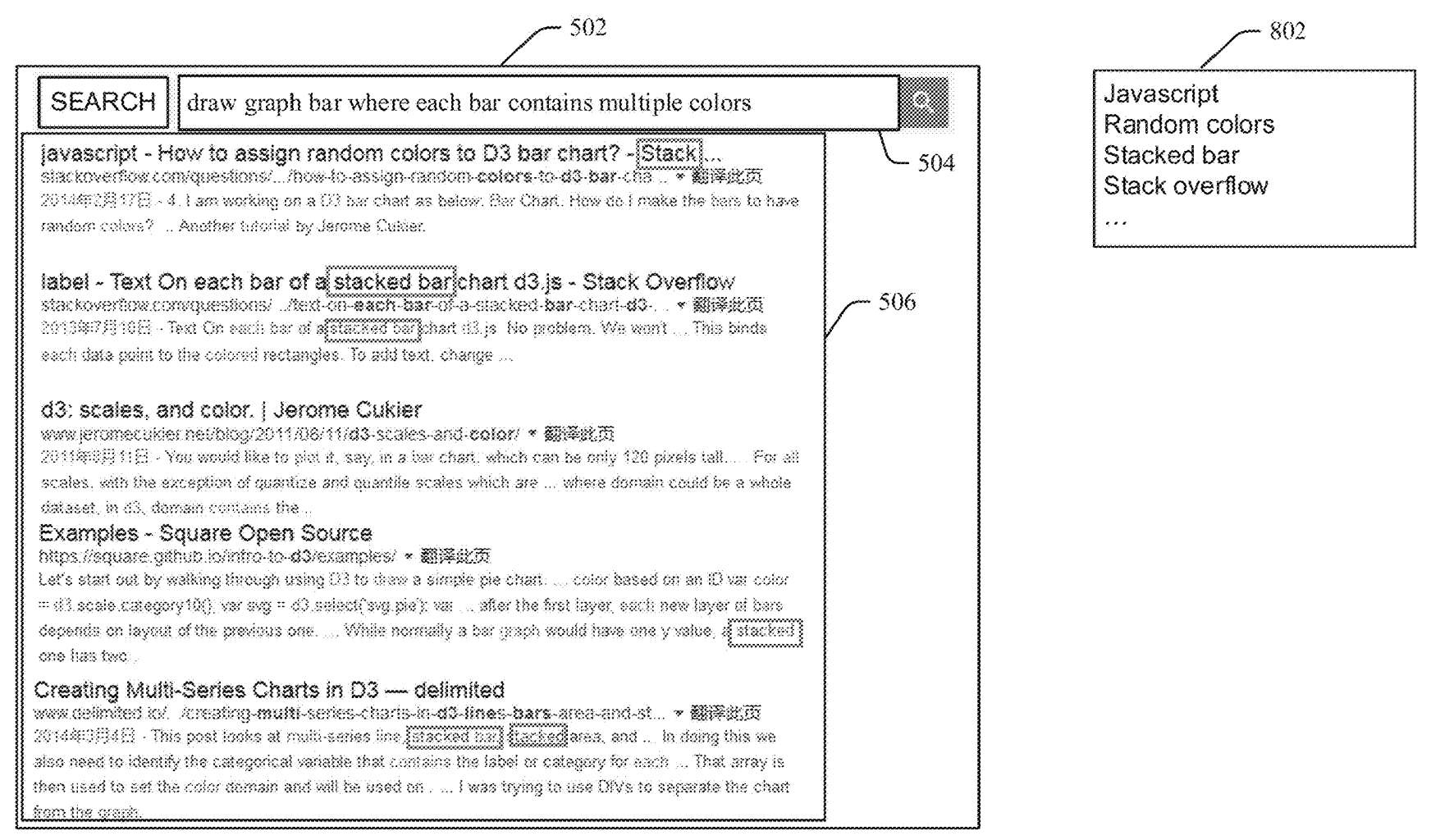

FIG. 8 illustrates a block diagram of an example, non-limiting search user interface 502 and candidate term list 802 from search results 506 in accordance with one or more embodiments described herein. Repetitive description of like elements employed in one or more embodiments described herein is omitted for sake of brevity. In this example, candidate term list 802 comprises a list of candidate terms (e.g., "Javascript", "Random colors", "Stack Bar", "Stack overflow", . . . ) that have been converted to candidate term vectors by candidate component 210.

Referring again to FIG. 2, specialist term component 104 can also include recommendation component 212 that can generate a recommended query terms list 902 based on a query associated with a user. Recommendation component 212 can compare candidate term vectors associated with candidate terms generated by candidate component 210 to refined clusters generated by refined clustering component 208 to determine candidate terms to add to a recommended query terms list. If a candidate term vector associated with a candidate term matches (e.g., exact match or within a defined threshold) a corpus term vector associated with a corpus term in a refined cluster, recommendation component 212 can add the candidate term as a recommended query term to recommended query terms list and can also add a corpus term closest to a center of the refined cluster to recommended query terms list.

Referring now to FIGS. 7 and 8, recommendation component 212 can determine that candidate terms "Javascript", "Random colors", and "Stack overflow" do not match any corpus terms in refined clusters 702, 704, and 706, and not add candidate terms "Javascript", "Random colors", and "Stack overflow" to recommended query terms list 902. Recommendation component 212 can determine that the candidate term "Stacked bar" matches any corpus term "Stacked bar" in refined cluster 706, and add candidate term "Stacked bar" as a recommended query term to recommended query terms list 902, and also add corpus term "Chart" nearest to the center of refined cluster 706 as another recommended query term to recommended query terms list 902.

If none of the candidate term vectors associated with the candidate terms match any corpus term vectors associated with corpus terms in the refined clusters, recommendation component 212 can select a refined cluster with a center vector that is closest to the query vector based on respective distances from the query vector to the center vectors of the refined clusters. Recommendation component 212 can add a corpus term nearest to the center of the selected refined cluster as a recommended query term to recommended query terms list.

If recommended query terms list comprises more one recommended query term, recommendation component 212 can employ a sorting technique to order the recommended query terms in recommended query terms list. In a non-limiting example, recommendation component 212 can determine a weight W for each recommended query term according to the following equation (1).

$$W = w1 * EucD + w2 * tfidf \quad \text{Equation (1):}$$

where EudD is the Euclidian distance of a candidate term vector associated with the recommended query term from the query vector associated with the query, tfidf is the term frequency-inverse document frequency of the recommended query term in the search result and/or text corpus, w1 is a weight factor for EucD, and w2 is a weight factor for tdidf. In a non-limiting example, recommendation component 212 can sort the recommended query terms from highest to lowest based on their associated weights W, where highest can be indicative of greater likeliness of being specialized to a topic of desired information associated with the query.

It is to be appreciated that recommendation component 212 can employ any suitable sorting technique to order the recommended query terms in recommended query terms list.

Recommendation component 212 can generate a presentation of the recommended query terms list in a user interface associated with the query and/or search results. It is to be appreciated that the presentation of the recommended query terms list can be in any suitable format, non-limiting examples of which include, a menu, a drop-down list, a pop-up window, an overlay, a hoverable drop down, a widget, or any other suitable format for presenting a list of one or more recommended query terms.

Figure 9:
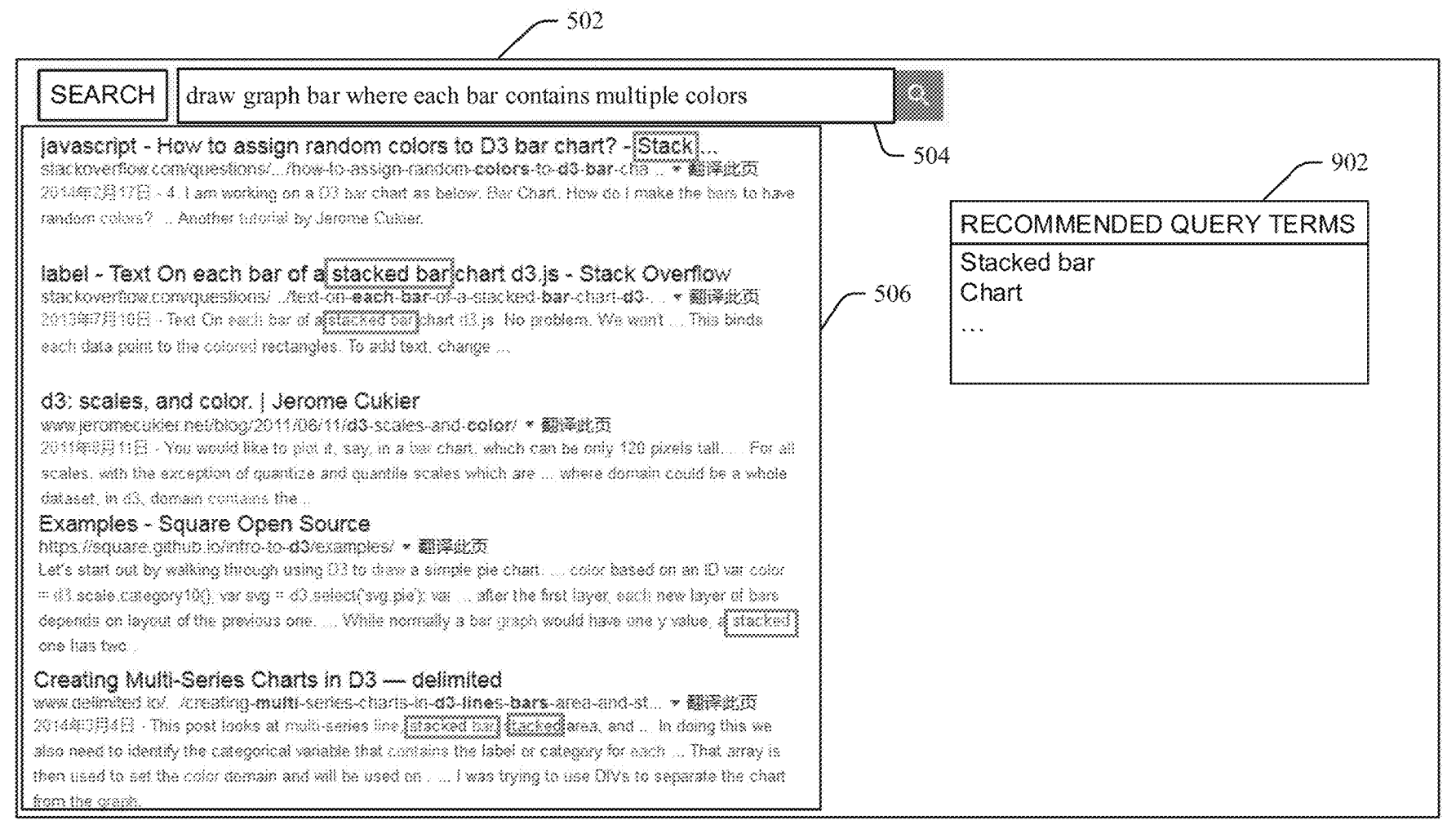

FIG. 9 illustrates a block diagram of an example, non-limiting search user interface 502 from FIG. 5 with a recommended query terms list 902 in accordance with one or more embodiments described herein. Repetitive description of like elements employed in one or more embodiments described herein is omitted for sake of brevity. In this example, search user interface 502 is depicted with a pop-up window with recommended query terms list 902.

In a non-limiting example, operations of corpus component 202 and coarse clustering component 204 can occur offline in advance of analysis of user's queries for recommended query terms. In another non-limiting example, operations of corpus component 202 and coarse clustering component 204 can occur online (e.g., in real time) in parallel with analysis of users' queries to provide real-time recommendations on query terms.

In a non-limiting example, operations of cluster selection component 206, refined clustering component 208, candidate component 210 and recommendation component 212 can occur in real-time as a user is executing a query in order to provide real-time recommendations on query terms.

While FIGS. 1 and 2 depict separate components in server 102, it is to be appreciated that two or more components can be implemented in a common component. Further, it is to be appreciated that the design of the server 102 can include other component selections, component placements, etc., to facilitate automatically generating recommended query terms that are specialized to a topic of desired information based on a query associated with a user in accordance with one or more embodiments described herein. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to automatically generating recommended query terms that are specialized to a topic of desired information based on a query associated with a user. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems automatically generating recommended query terms that are specialized to a topic of desired information based on a query associated with a user in a live environment by improving processing efficiency among processing components in these systems, reducing delay in processing performed by the processing components, and/or improving the accuracy in which the processing systems automatically generate recommended query terms that are specialized to a topic of desired information based on a query associated with a user.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 10:
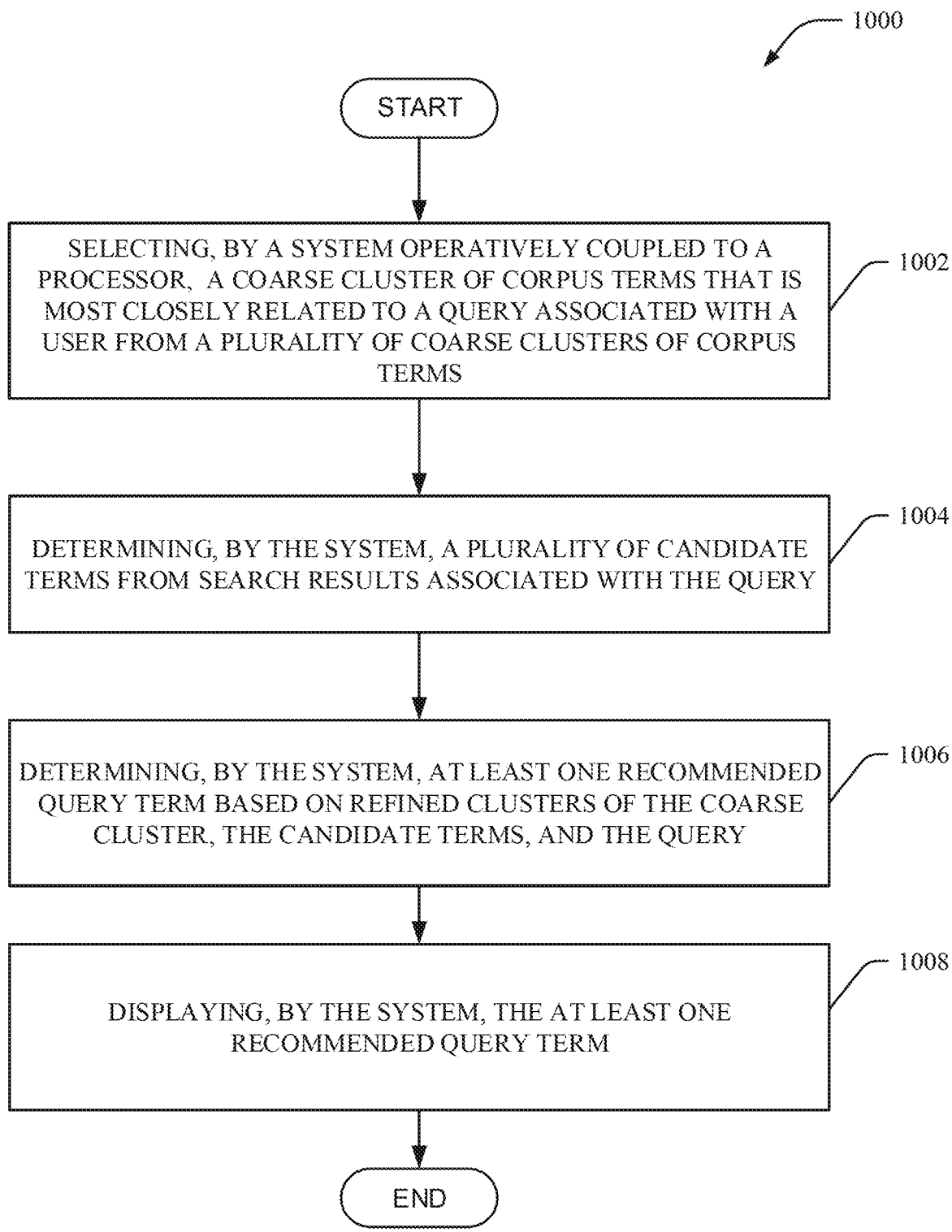
FIG. 10 illustrates a flow diagram of an example, non-limiting computer-implemented method in accordance with one or more embodiments described herein.

FIG. 10 illustrates a flow diagram of an example, non-limiting computer-implemented method 1000 that facilitates automatically generating recommended query terms that are specialized to a topic of desired information based on a query associated with a user in accordance with one or more embodiments described herein. Repetitive description of like elements employed in other embodiments described herein is omitted for sake of brevity.

At 1002, method 1000 can comprise selecting, by a system operatively coupled to a processor, a coarse cluster of corpus terms that is most closely related to a query from a plurality of coarse clusters of corpus terms (e.g., via a cluster selection component 206, a corpus component 202, a coarse clustering component 204, a specialist term component 104, and/or a server 102). At 1004, method 1000 can comprise determining, by the system, a plurality of candidate terms from search results associated with the query (e.g., via a candidate term component 210, a specialist term component 104, and/or a server 102). At 1006, method 1000 can comprise determining, by the system, at least one recommended query term based on refined clusters of the coarse cluster, the candidate terms, and the query (e.g., via a recommendation component 212, a refined clustering component 208, a cluster selection component 206, a corpus component 202, a coarse clustering component 204, a specialist term component 104, and/or a server 102). At 1008, method 1000 can comprise displaying, by the system, the at least one recommended query term (e.g., via a recommendation component 212, a refined clustering component 208, a cluster selection component 206, a corpus component 202, a coarse clustering component 204, a specialist term component 104, and/or a server 102).

Figure 11:
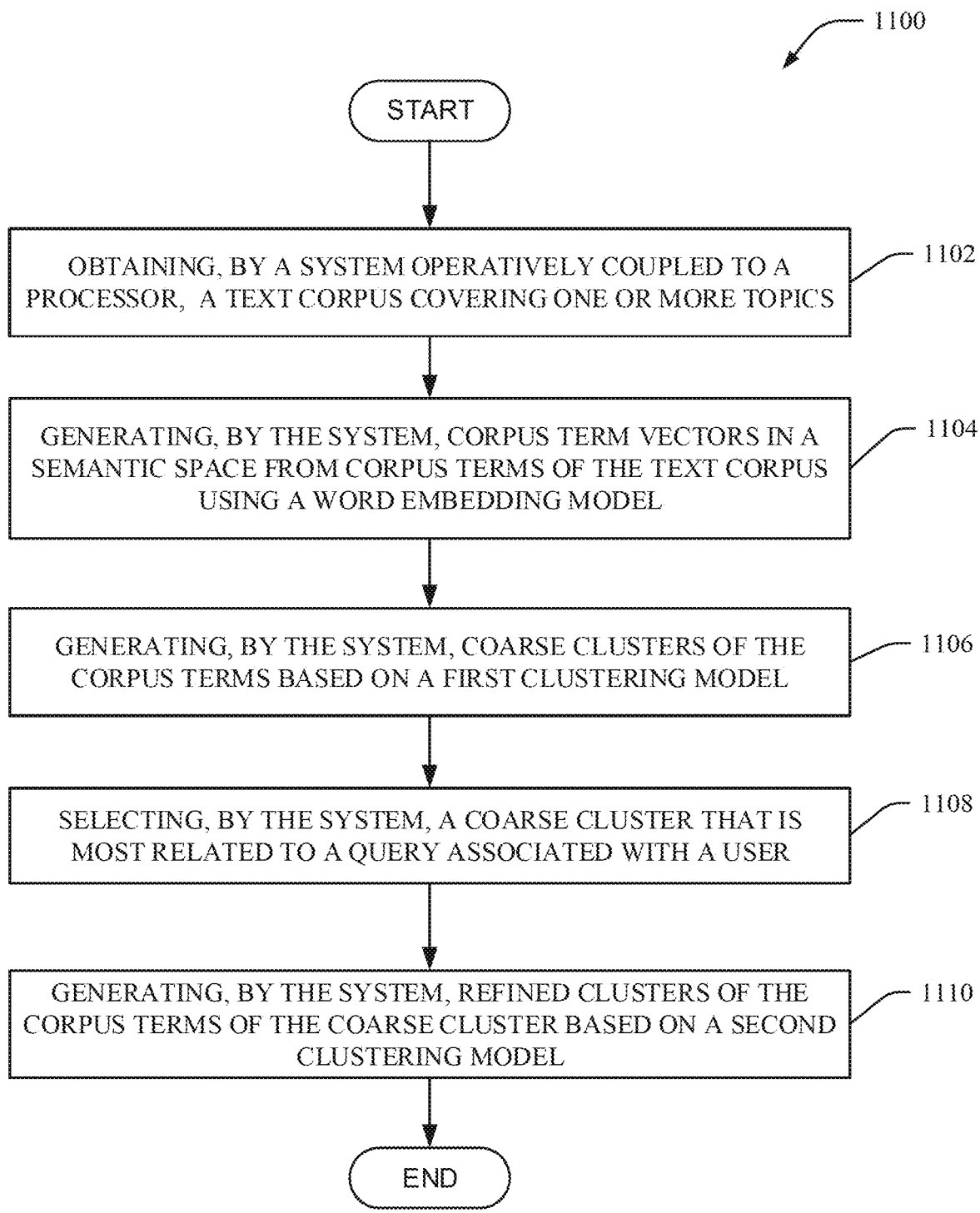
FIG. 11 illustrates a flow diagram of another exemplary, non-limiting computer-implemented method in accordance with one or more embodiments described herein.

FIG. 11 illustrates a flow diagram of an example, non-limiting computer-implemented method 1100 that facilitates automatically generating refined clusters from a selected coarse cluster from a plurality of coarse clusters associated with corpus terms of a text corpus in accordance with one or more embodiments described herein. Repetitive description of like elements employed in other embodiments described herein is omitted for sake of brevity.

At 1102, method 1100 can comprise obtaining, by a system operatively coupled to a processor, a text corpus covering one or more topics (e.g., via a corpus component 202, a specialist term component 104, and/or a server 102). At 1104, method 1100 can comprise generating, by the system, corpus term vectors in a semantic space from corpus terms of the text corpus using a word embedding model (e.g., via a corpus component 202, a specialist term component 104, and/or a server 102). At 1106, method 1100 can comprise generating, by the system, coarse clusters of the corpus terms based on a first clustering model (e.g., via a coarse clustering component 204, a specialist term component 104, and/or a server 102). At 1108, method 1100 can comprise selecting, by the system, a coarse cluster that is most related to a query (e.g., via a cluster selection component 206, a specialist term component 104, and/or a server 102). At 1110, method 1100 can comprise generating, by the system, refined clusters of the corpus terms of the coarse cluster based on a second clustering model (e.g., via a refined clustering component 208, a specialist term component 104, and/or a server 102).

Figure 12:
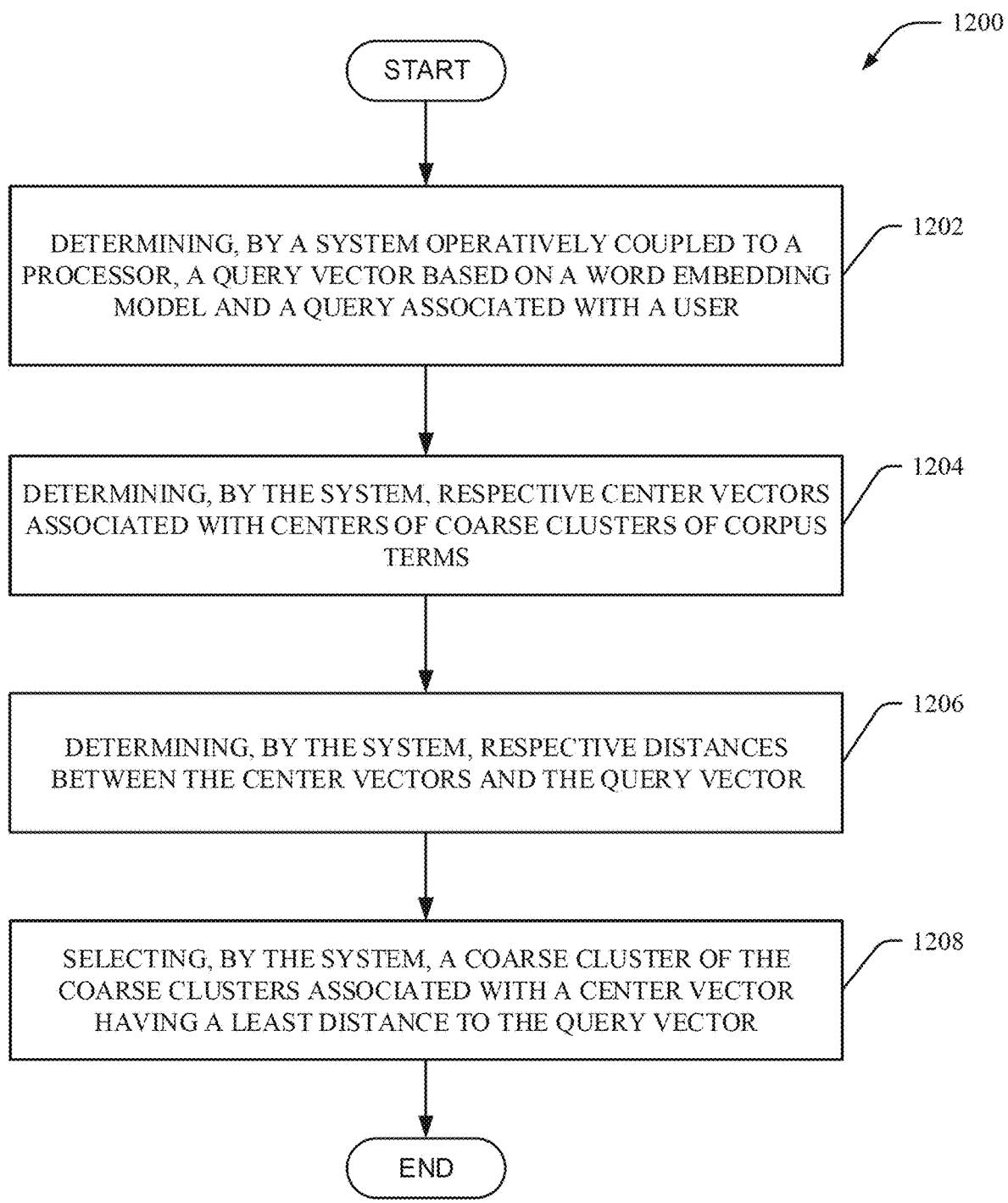
FIG. 12 illustrates a flow diagram of another exemplary, non-limiting computer-implemented method in accordance with one or more embodiments described herein.

FIG. 12 illustrates a flow diagram of an example, non-limiting computer-implemented method 1200 that facilitates automatically selecting a coarse cluster from a plurality of coarse clusters associated with corpus terms of a text corpus in accordance with one or more embodiments described herein. Repetitive description of like elements employed in other embodiments described herein is omitted for sake of brevity.

At 1202, method 1200 can comprise determining, by a system operatively coupled to a processor, a query vector based on the query and a word embedding model (e.g., via a cluster selection component 206, a specialist term component 104, and/or a server 102). At 1204, method 1200 can comprise determining, by the system, respective center vectors associated with centers of coarse clusters of corpus terms (e.g., via a cluster selection component 206, a specialist term component 104, and/or a server 102). At 1206, method 1200 can comprise determining, by the system, respective distances between the center vectors and the query vector (e.g., via a cluster selection component 206, a specialist term component 104, and/or a server 102). At 1208, method 1200 can comprise selecting, by the system, a coarse cluster of the coarse clusters associated with a center vector having a least distance to the query vector (e.g., via a cluster selection component 206, a specialist term component 104, and/or a server 102).

Figure 13:
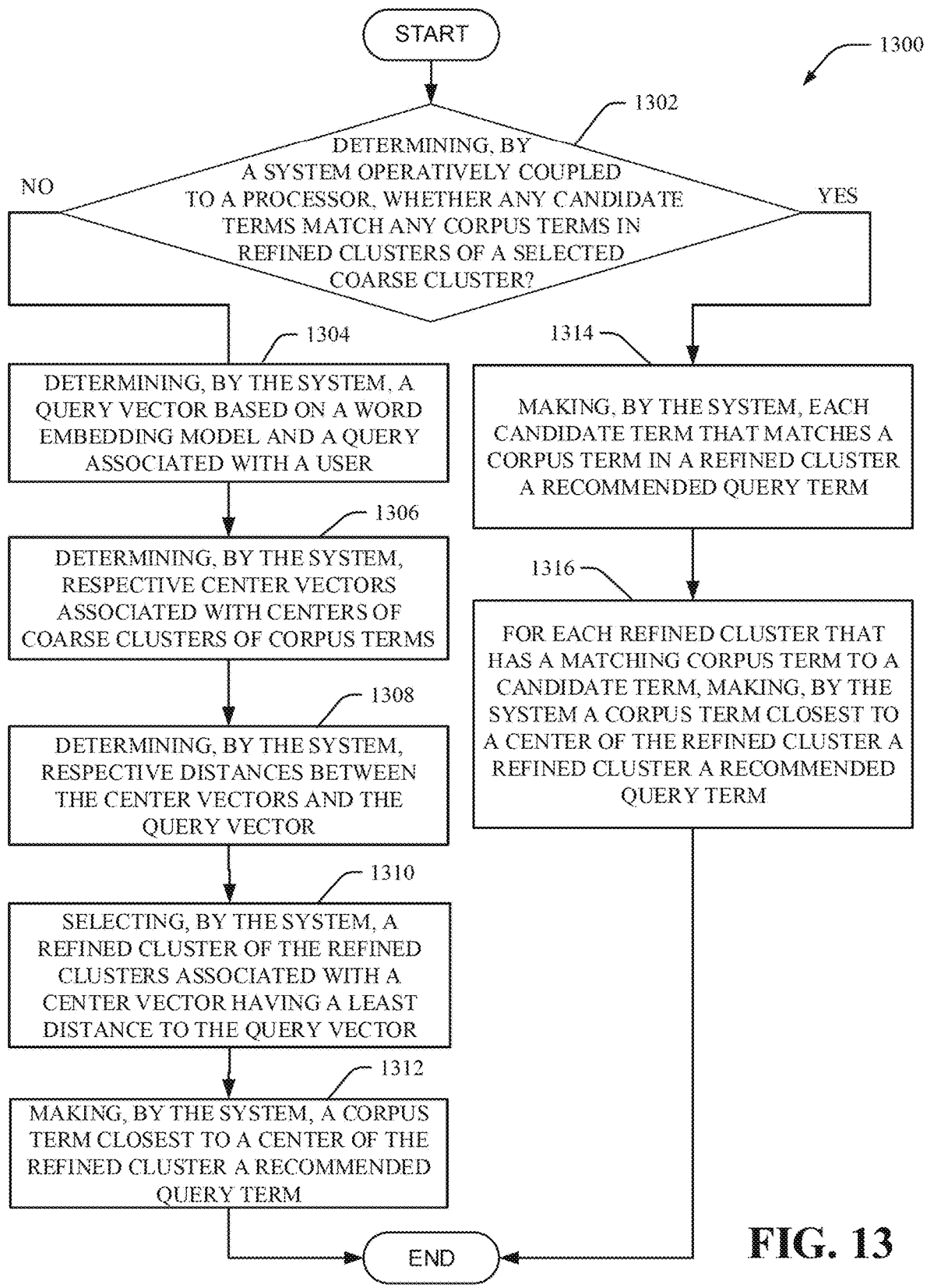
FIG. 13 illustrates a flow diagram of an example, non-limiting computer-implemented method in accordance with one or more embodiments described herein.

FIG. 13 illustrates a flow diagram of an example, non-limiting computer-implemented method 1300 that facilitates automatically generating recommended query terms that are specialized to a topic of desired information based on a query associated with a user in accordance with one or more embodiments described herein. Repetitive description of like elements employed in other embodiments described herein is omitted for sake of brevity.

At 1302, a determination is made whether any candidate terms match any corpus terms in refined clusters of a selected coarse cluster (e.g., via a recommendation component 212, a refined clustering component 208, a cluster selection component 206, a corpus component 202, a coarse clustering component 204, a specialist term component 104, and/or a server 102). If the determination is "NO," meaning that no candidate terms match any corpus terms in refined clusters of the selected coarse cluster, the method can proceed to 1304. If the determination is "YES," meaning that at least one candidate term matches at least one corpus term in at least one refined cluster of the selected coarse cluster, the method can proceed to 1314. At 1304, method 1300 can comprise determining, by the system, a query vector based on a query and a word embedding model (e.g., via a recommendation component 212, a refined clustering component 208, a cluster selection component 206, a corpus component 202, a coarse clustering component 204, a specialist term component 104, and/or a server 102). At 1306, method 1300 can comprise determining, by the system, respective center vectors associated with centers of coarse clusters of corpus terms (e.g., via a recommendation component 212, a refined clustering component 208, a cluster selection component 206, a corpus component 202, a coarse clustering component 204, a specialist term component 104, and/or a server 102). At 1308, method 1300 can comprise determining, by the system, respective distances between the center vectors and the query vector (e.g., via a recommendation component 212, a refined clustering component 208, a cluster selection component 206, a corpus component 202, a coarse clustering component 204, a specialist term component 104, and/or a server 102). At 1310, method 1300 can comprise selecting, by the system, a refined cluster of the refined clusters associated with a center vector having a least distance to the query vector (e.g., via a recommendation component 212, a refined clustering component 208, a cluster selection component 206, a corpus component 202, a coarse clustering component 204, a specialist term component 104, and/or a server 102). At 1312, method 1300 can comprise making, by the system, a corpus term closest to a center of the refined cluster a recommended query term (e.g., via a recommendation component 212, a refined clustering component 208, a cluster selection component 206, a corpus component 202, a coarse clustering component 204, a specialist term component 104, and/or a server 102).

At 1314, method 1300 can comprise making by the system, each candidate term that matches a corpus term in a refined cluster a recommended query term (e.g., via a recommendation component 212, a refined clustering component 208, a cluster selection component 206, a corpus component 202, a coarse clustering component 204, a specialist term component 104, and/or a server 102). At 1316, method 1300 can comprise for each refined cluster that has a matching corpus term to a candidate term, making, by the system a corpus term closest to a center of the refined cluster a refined cluster a recommended query term (e.g., via a recommendation component 212, a refined clustering component 208, a cluster selection component 206, a corpus component 202, a coarse clustering component 204, a specialist term component 104, and/or a server 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 14:
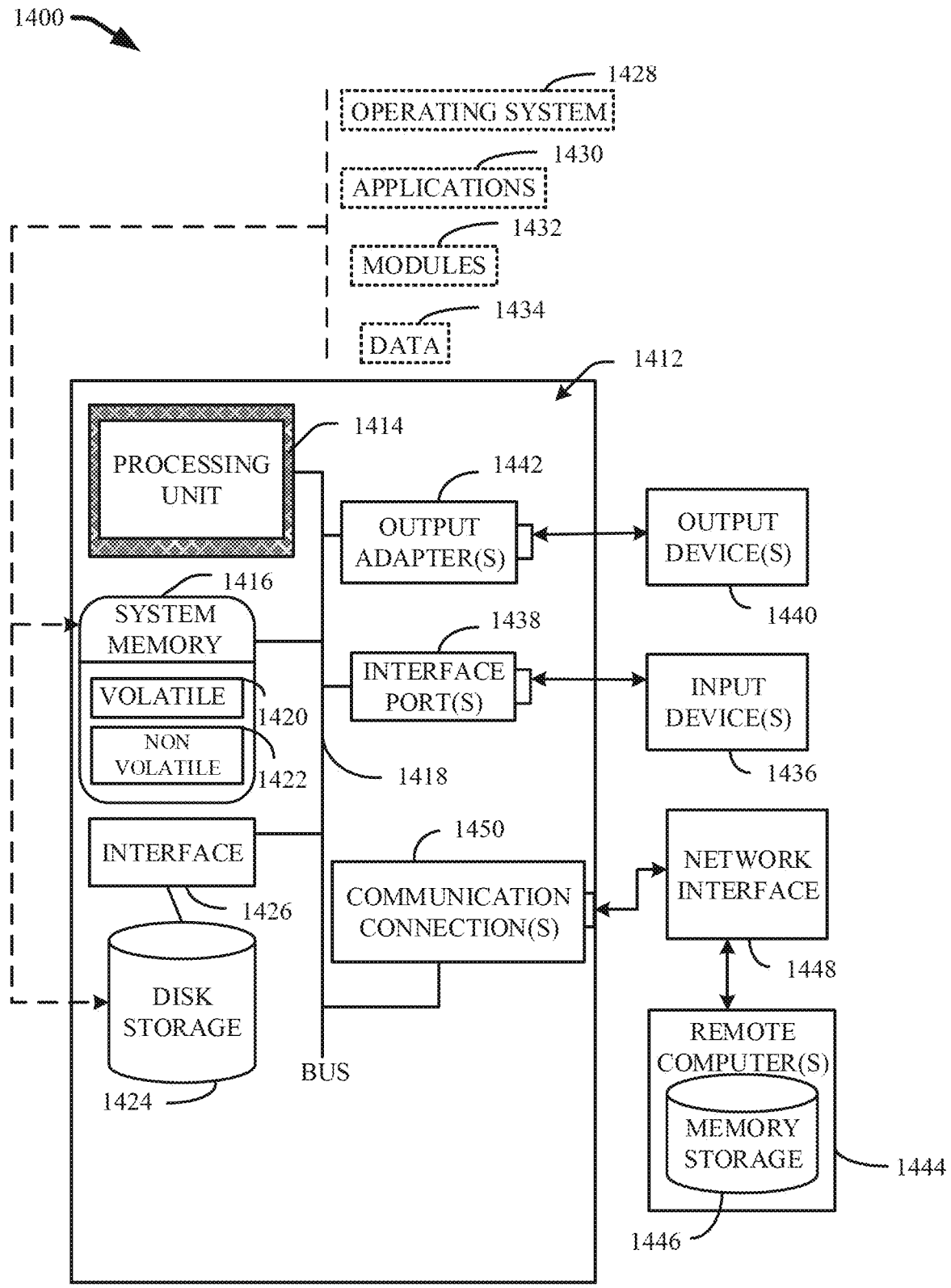
FIG. 14 illustrates a block diagram of an example, non-limiting operating environment in accordance with one or more embodiments described herein.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment in which one or more embodiments described herein can be facilitated. Repetitive description of like elements employed in other embodiments described herein is omitted for sake of brevity.

With reference to FIG. 14, a suitable operating environment 1400 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1494), and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/nonvolatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

In an embodiment, for example, computer 1412 can perform operations comprising: in response to receiving a query, selecting, by a system, a coarse cluster of corpus terms having a defined relatedness to the query associated with a plurality of coarse clusters of corpus terms; determining, by the system, a plurality of candidate terms from search results associated with the query; determining, by the system, at least one recommended query term based on refined clusters of the coarse cluster, the plurality of candidate terms, and the query; and communicating at least one recommended query term to a device associated with the query.

It is to further be appreciated that operations of embodiments disclosed herein can be distributed across multiple (local and/or remote) systems.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor, operably coupled to the memory, and that executes computer executable components stored in the memory, wherein the computer executable components comprise:
   a cluster selection component that, in response to receiving a query, selects a coarse cluster of corpus terms, having a defined relatedness to the query, from a plurality of coarse clusters of corpus terms associated with a text corpus;
   a refined clustering component that places respective corpus terms of the coarse cluster into refined clusters based on a first clustering model;
   a candidate component that determines a plurality of candidate terms from search results associated with the query; and
   a recommendation component that:
      determines at least one recommended query term based on a subset of the refined clusters selected based on the plurality of candidate terms from the search results, and the query, wherein the determination of the at least one recommended query term comprises:
         in response to a determination that a candidate term of the plurality of candidate terms matches a corpus term in a refined cluster of the refined clusters:
         make the candidate term a recommended query term of the at least one recommended query term, and
         make a corpus term closest to a center of the refined cluster another recommended query term of the at least one recommended query term; and
      communicates one or more recommended query terms of the at least one recommended query term to a device associated with the query.

2. The system of claim 1, wherein selection of the coarse cluster by the cluster selection component comprises:

determination of a first vector based on the query and a word embedding model;

determination of respective second vectors associated with centers of the coarse clusters of corpus terms based on the word embedding model;

determination of respective distances between the second vectors and the first vector; and selection of the coarse cluster of corpus terms associated with a second vector of the second vectors having a least distance to the first vector.

3. The system of claim 1, wherein the plurality of candidate terms are selected from a defined number of top results of the search results.

4. The system of claim 1, wherein the recommendation component determines whether a candidate term of the plurality of candidate terms matches a corpus term of the corpus terms based on a distance between a first vector associated with the candidate term and a second vector associated with the corpus term satisfying a distance threshold.

5. The system of claim 1, wherein the determination of the at least one recommended query term further comprises:
in response to a determination that none of the plurality of candidate terms match any corpus terms in the refined clusters:
determine a first vector based on the query and a word embedding model,
determine respective second vectors associated with centers of the refined clusters of corpus terms based on the word embedding model,
determine respective distances between the second vectors and the first vector,
select another refined cluster of corpus terms associated with a second vector having a least distance to the first vector, and
make another corpus term closest to a center of the other refined cluster an additional recommended query term of the at least one recommended query term.

6. The system of claim 1, further comprising a corpus component that determines the corpus terms associated with the plurality of coarse clusters of corpus terms from the text corpus based on a word embedding model.

7. The system of claim 6, wherein the corpus component determines respective vectors associated with the corpus terms from the text corpus based on the word embedding model.

8. The system of claim 7, further comprising a coarse clustering component that places the corpus terms from the text corpus in the plurality of coarse clusters of corpus terms based on the respective vectors associated with the corpus terms and a second clustering model.

9. The system of claim 1, wherein the recommendation component generates a display of the at least one recommended query term and thereby reduces processing by reducing inaccurate queries.

10. A computer-implemented method, comprising:
in response to receiving a query, selecting, by a system operatively coupled to a processor, a coarse cluster of corpus terms, having a defined relatedness to the query, from a plurality of coarse clusters of corpus terms associated with a text corpus;
determining, by the system, a plurality of candidate terms from search results associated with the query;
placing, by the system, respective corpus terms of the coarse cluster into refined clusters based on a first clustering model;
determining, by the system, at least one recommended query term based on a subset of the refined clusters selected based on the plurality of candidate terms from the search results, and the query, wherein the determining the at least one recommended query term comprises:
in response to determining that a candidate term matches a corpus term in a refined cluster of the refined clusters:
selecting the candidate term as a recommended query term of the at least one recommended query term; and
selecting a corpus term closest to a center of the refined cluster as another recommended query term of the at least one recommended query term; and
communicating, by the system, one or more recommended query terms of the at least one recommended query term to a device associated with the query.

11. The computer-implemented method of claim 10, further comprising communicating multiple recommended query terms as a sorted list based on a sorting criterion.

12. The computer-implemented method of claim 10, further comprising:
obtaining, by the system, the text corpus associated with one or more topics; and
generating, by the system, corpus term vectors in a semantic space from corpus terms of the text corpus using a word embedding model.

13. The computer-implemented method of claim 12, further comprising:
generating, by the system, coarse clusters of the corpus terms of the text corpus based on a second clustering model; and
selecting, by the system, a coarse cluster that is most related to the query.

14. The computer-implemented method of claim 13, wherein the selecting the coarse cluster comprises:
determining, by the system, a query vector based on the query and a word embedding model;
determining, by the system, respective center vectors associated with centers of the coarse clusters of the corpus terms;
determining, by the system, respective distances between the center vectors and the query vector;
selecting, by the system, the coarse cluster of the coarse clusters associated with a center vector having a least distance to the query vector.

15. The computer-implemented method of claim 10, wherein the determining the at least one recommended query term further comprises:
in response to determining that no candidate terms match any corpus terms in the refined clusters:
determining a first vector based on the query and a word embedding model;
determining respective second vectors associated with centers of the refined clusters of corpus terms;
determining respective distances between the second vectors and the first vector;
selecting another refined cluster of corpus terms associated with a second vector having a least distance to the first vector, and
selecting another corpus term closest to a center of the other refined cluster as an additional recommended query term of the at least one recommended query term.

16. A computer program product for generating recommended query terms, the computer program product comprising a computer readable storage medium having program instructions embodied therewith, the program instructions executable by a processing component to cause the processing component to:

select, in response to receiving a query, a coarse cluster of corpus terms having a defined relatedness to a query associated with a user from a plurality of coarse clusters of corpus terms;

place respective corpus terms of the coarse cluster into refined clusters based on a first clustering model;

determine a plurality of candidate terms from search results associated with the query;

for respective candidate terms that match corpus terms in the refined clusters according to a defined matching criterion:

add a candidate term of the plurality of candidate terms from the search results to a list of recommended query terms; and add, to the list of recommended query terms, a corpus term closest to a center of a refined cluster having a matching corpus term to the candidate term; and communicate at least one recommended query term from the list of recommended query terms to a device associated with the query.

17. The computer program product of claim 16, wherein the program instructions executable by the processing component further cause the processing component to:

in response to a determination that no candidate terms match any corpus terms in the refined clusters:

determine a first vector based on the query and a word embedding model;

determine respective second vectors associated with centers of the refined clusters of corpus terms;

determine respective distances between the second vectors and the first vector;

select another refined cluster of corpus terms associated with a second vector having a least distance to the first vector; and select another corpus term closest to a center of the other refined cluster as a recommended query term of recommended query terms.

18. The computer program product of claim 16, wherein the program instructions executable by the processing component further cause the processing component to:

assign weights to respective recommended query terms of the list of recommended query terms based on a function that factors a distance of a recommended query term to the query and a term frequency-inverse document frequency of the recommended query term; and sort the recommended query terms of the list of recommended query terms based on the assigned weights.

19. The computer program product of claim 16, wherein the program instructions executable by the processing component further cause the processing component to determine the corpus terms associated with the plurality of coarse clusters of corpus terms from a text corpus based on a word embedding model.

20. The computer program product of claim 19, wherein the program instructions executable by the processing component further cause the processing component to:

determines respective vectors associated with the corpus terms from the text corpus based on the word embedding model; and place the corpus terms from the text corpus in the plurality of coarse clusters of corpus terms based on the respective vectors associated with the corpus terms and a second clustering model.

* * * * *